(12) United States Patent
Murata et al.

(10) Patent No.: US 6,352,742 B1
(45) Date of Patent: Mar. 5, 2002

(54) METHOD FOR PRODUCING POLYMER ELECTROLYTE MEMBRANE AND FUEL CELL

(75) Inventors: Makoto Murata; Tetsu Yamamoto, both of Saitama (JP); Gregor Deckers, Frankfurt am Main (DE)

(73) Assignee: Celanese Ventures GmbH (DE)

( * ) Notice: Subject to any disclaimer, the term of this patent is extended or adjusted under 35 U.S.C. 154(b) by 0 days.

(21) Appl. No.: 09/424,164

(22) PCT Filed: May 22, 1998

(86) PCT No.: PCT/JP98/02247

§ 371 Date: Dec. 20, 1999

§ 102(e) Date: Dec. 20, 1999

(87) PCT Pub. No.: WO98/52732

PCT Pub. Date: Nov. 26, 1998

(30) Foreign Application Priority Data

May 22, 1997 (JP) .............................................. 9-132558
May 8, 1998 (JP) ........................................... 10-125560

(51) Int. Cl.[7] .............................. B05D 5/12; H01M 8/10
(52) U.S. Cl. ......................................... 427/115; 429/31
(58) Field of Search .............................. 429/31; 427/115

(56) References Cited

U.S. PATENT DOCUMENTS 5,132,352 A * 7/1992 Bass et al. ..................... 429/31
5,561,202 A * 10/1996 Helmer-Metzmann et al. ... 525/471
5,599,639 A * 2/1997 Sansone et al. ................ 429/33
6,001,500 A * 12/1999 Bass et al. ..................... 429/31

FOREIGN PATENT DOCUMENTS

| EP | 0084221 A | * | 7/1983 | ............ G02B/5/00 |
| WO | WO-9613872 A | * | 5/1996 | ............ H01M/8/10 |

* cited by examiner

Primary Examiner—Stephen Kalafut
Assistant Examiner—Julian A. Mercado
(74) Attorney, Agent, or Firm—Connolly Bove Lodge & Hutz LLP

(57) ABSTRACT

A method for producing a polymer electrolyte membrane is disclosed. A liquid medium is introduced into a cylinder having an inner surface having a cylindrical configuration. The liquid medium has at least one percent by weight of a polymer electrolyte and a solvent having a boiling point or an azeotropic point ranging from 60 to 220° C. Subsequently, the cylinder is rotated for evaporating the solvent by means of a centrifugal force created by such rotation so as to form a polymer electrolyte membrane having a cylindrical configuration with a substantially uniform thickness on the inner surface of the cylinder. Onto the inner surface of the polymer electrolyte membrane, a catalytic layer containing a catalytic particle may be formed.

5 Claims, 2 Drawing Sheets

METHOD FOR PRODUCING POLYMER ELECTROLYTE MEMBRANE AND FUEL CELL

FIELD OF THE INVENTION

The present invention relates to a method for producing a polymer electrolyte membrane and a fuel cell.

RELATED ART

A fuel cell includes an electrolyte and a pair of electrodes. In the fuel cell, a hydrogen gas is supplied to one of the electrodes, and an oxidizing agent such as an oxygen gas is supplied to the other electrode, thereby converting chemical energy involved in the oxidation of the fuel into electric energy. The electrolyte permeates hydrogen ions but does not permeate reactive gases such as the hydrogen gas and the oxygen gas.

As the electrolyte for the fuel cell, a solid such as a polymer electrolyte membrane and a liquid such as phosphoric acid are used. Recently, a polymer electrolyte membrane has preferably been used as the electrolyte for the fuel cell, and particularly perfluorosulfonic acid polymer has been receiving attention. Typically, the perfluorosulfonic acid polymer has a framework of perfluorocarbon such as a copolymer of tetrafluoroethylene and trifluorovinyl and a side chain being bonded thereto and having a sulfonic acid group such as a side chain that a sulfonic acid group is bonded to perfluoroalkylene group. The sulfonic acid group releases a hydrogen ion to produce an anion, and therefore conducts proton.

Typically, the polymer electrolyte membrane has been produced with melt extrusion technology. Since, perfluoropolymer does not dissolve in a solvent, a special process such as melt extrusion and membrane extension is required to produce a membrane and to control its properties such as a thickness. Therefore, it is desired to provide a convenient process for producing a polymer electrolyte membrane. Moreover, it has always been desired to improve an output of the fuel cell.

Japanese patent application laid open No. 3-106616 teaches a method for producing a tubular body comprising the steps of: coating a raw material on an inner surface of a cylinder having a cylindrical configuration while rotating the cylinder; rotating the cylinder thereby forming a tubular body by a centrifugal force of the rotation; and removing the tubular body from the cylinder. However, the document does not teach a polymer electrolyte membrane for a fuel cell at all.

U.S. Pat. No. 5,561,202 discloses a polymer electrolyte membrane. However, the membrane is cast onto a glass plate and afterwards coagulated.

SUMMARY OF THE INVENTION

According to one aspect of the present invention, there is provided a method for producing a polymer electrolyte membrane adapted to a fuel cell, comprising the steps of:

introducing a first liquid medium into a cylinder having an inner surface having a cylindrical configuration, the first liquid medium having at least one percent by weight of a first polymer electrolyte and a first solvent having a boiling point or an azeotropic point ranging from 60 to 220° C.; and rotating the cylinder for evaporating the first solvent by means of a centrifugal force created by such rotation so as to form a first polymer electrolyte membrane having a cylindrical configuration with a substantially uniform thickness on the inner surface of the cylinder.

According to another aspect of the present invention, there is provided a fuel cell comprising:

a polymer electrolyte membrane obtained by cutting off a polymer electrolyte membrane obtained by the aforementioned method; and a pair of electrodes sandwiching the polymer electrolyte membrane.

PREFERRED EMBODIMENTS OF THE INVENTION

Figure 1:
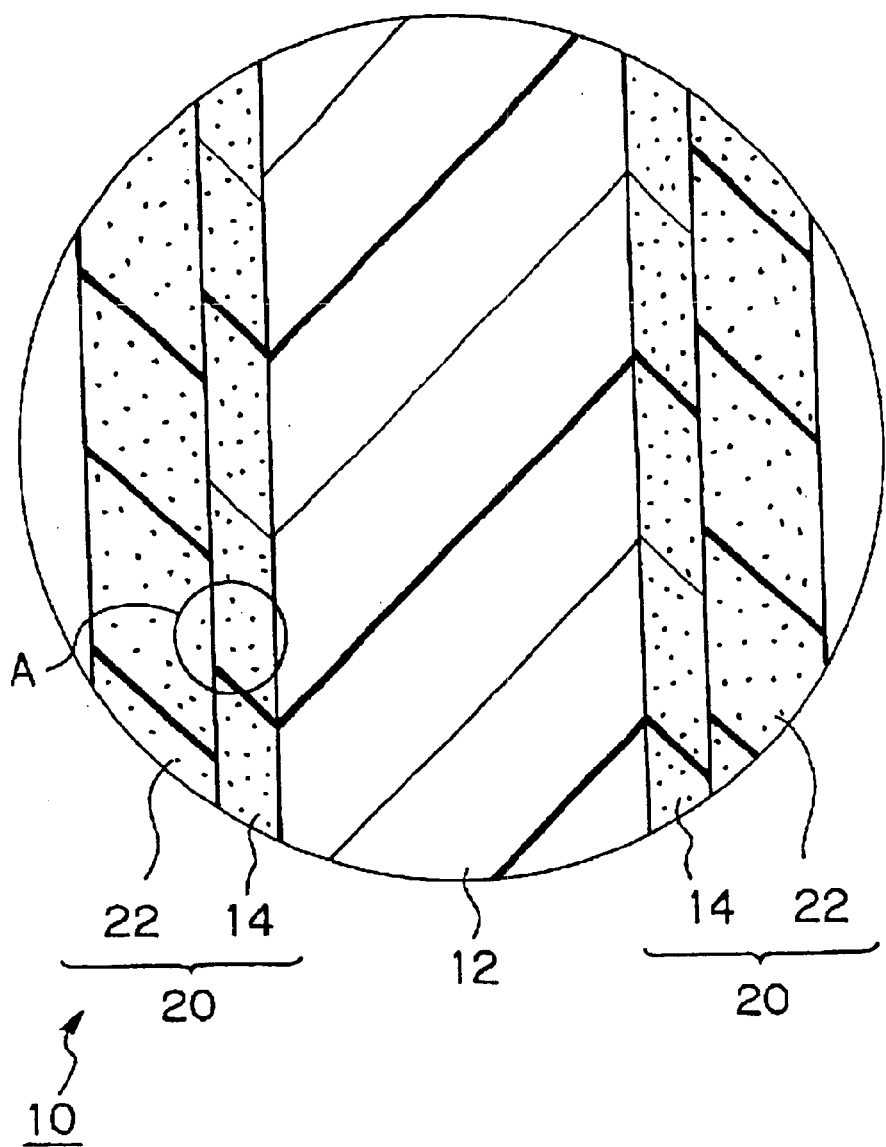
FIG. 1 is a cross section of a part of a fuel cell.

In referring to FIG. 1, a fuel cell 10 has a polymer electrolyte membrane 12 and a pair of electrodes 20 sandwiching the polymer electrolyte membrane 12. Each of the electrode 20 has a catalytic layer 14 and a gas diffusion layer 22 for supplying a reaction gas with the catalytic layer 14.

Figure 2:
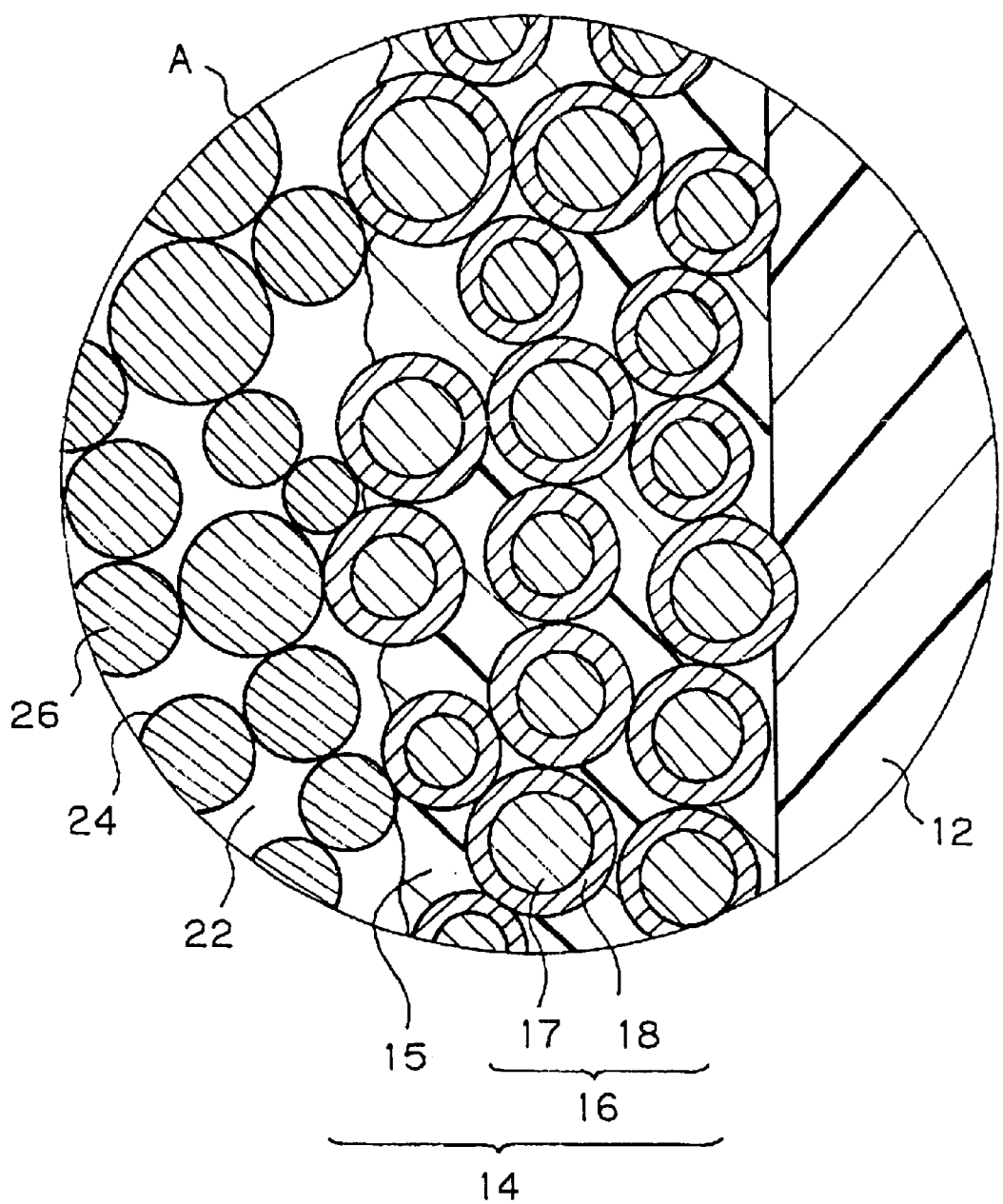
FIG. 2 is an enlarged portion A of FIG. 1.

In FIG. 2, the catalytic layer 14 has a matrix 15 consisting essentially of a polymer electrolyte membrane and a plurality of catalytic particles 16 being dispersed in the matrix. The matrix 15 along with the polymer electrolyte membrane 12 forms a channel for conducting hydrogen ions. The material for the matrix 15 is preferably the same as the material for the polymer electrolyte membrane 12. However, these materials may be different. The matrix 15 may be porous so as to allow the reactive gas to pass through. The catalytic particles preferably contact each other, thereby forming a channel for conducting electrons.

Each of the catalytic particles 16 has an electrically conductive carrier 17 and a catalytic substance 18 being loaded onto a surface of the electrically conductive carrier 17. The electrically conductive carrier may be carbon particles. The catalytic substance 18 may be platinum metal or a platinum alloy. In FIG. 2, the catalytic substance 18 is coated onto the surface of the electrically conductive carrier 17. Alternatively, the catalytic substance 18 may have a particle configuration.

The gas diffusion layer 22 is porous so as to allow the reactive gas to pass through. In FIG. 2, the gas diffusion layer 22 is made of a plurality of electrically conductive particles 26 forming a gap 24. The electrically conductive particles may be carbon particles and same as electrically conductive carrier 17. Alternatively, the electrically conductive particle 26 is replaced by electrically conductive substance such as carbon fibers.

According to the method of the present invention, the polymer electrolyte membrane 12 may be produced. Moreover, the polymer electrolyte membrane 12 as well as a precursor for a fuel cell having one of or both catalytic layers 14 may be produced. Furthermore, a fuel cell may be produced by fixing the gas diffusion layer 22 to the precursor.

A method in accordance with the present invention is explained hereinafter.

Firstly, a prescribed liquid medium is introduced into a cylinder having an inner surface having a cylindrical configuration. The liquid medium may be introduced by pipette and so on. Alternatively, the liquid may be introduced by a machine. At the time of the introduction, the cylinder may be rotating or remain still.

The liquid medium has at least one percent by weight of a polymer electrolyte and a solvent having a boiling point or an azeotropic point ranging from 60 to 220° C. The liquid medium may be either a solution or a suspension. In case of the solution, the polymer electrolyte is dissolved in the solvent. In case of the suspension, particles of the polymer electrolyte serving as a dispersion phase is dispersed in a solvent serving as a continuous phase. Alternatively, the liquid medium may be a slurry or a paste. Preferably, the liquid medium contain not less than 1 percent by weight of the polymer electrolyte and further preferably not less than 2 percent by weight.

Preferably, the polymer electrolyte is soluble to a solvent. Specifically, a solution preferably dissolves not less than 1 percent by weight of the polymer electrolyte and further preferably not less than 2 percent by weight. The features facilitates forming a uniform polymer electrolyte membrane without forming pores therein.

Preferably, the polymer electrolyte is sufficiently stable in use as the polymer electrolyte for a fuel cell and conduct sufficient protons.

For example, the polymer electrolyte is preferably a thermoplastic polymer having a sulfonation rate of 30 to 90 percent, and further preferably a thermoplastic polymer having a sulfonation rate of 40 to 70 percent. A ratio of the sulfonation rate refers to a proportion of a sulfonic group per repeating unit of the thermoplastic polymer. For example, when each repeating unit of the thermoplastic polymer always has one sulfonic group, the sulfonation rate is 100 percent.

The thermoplastic polymer includes, for example, polyether, polysulfone, polyphenylene sulfide, polyamide, polyimide and so on. The polyether polymer includes poly(etherketone), which further includes poly(etheretherketone) and poly(etberetherketoneketone), and poly(ethersulfone).

Alternatively, the polymer electrolyte may be a basic polymer. The basic polymer includes, for example, poly(benzimidazole), poly(pyridine), poly(pyrimidine), poly(imidazole), poly(benzthiazole), poly(benzoxazole), poly(oxadizole), poly(quinoline), poly(quinoxaline), poly(thiadiazole), poly(tetrazapyrene), poly(oxazole), poly(thiazole), poly(vinylpyridine), poly(vinylimidazole) and so on. Among these, poly(benzimidazole) is preferable. Basic polymers such as poly(benzimidazole) disclosed in WO96/13872 may preferably be used.

Poly(benzimidazole) having a formula as follows may preferably be used:

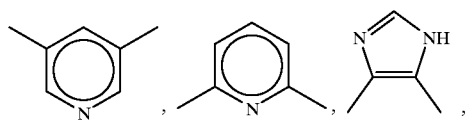

where R is an alkylene radical, a perfluoroalkylene radical, or a substituent having a formula as follows:

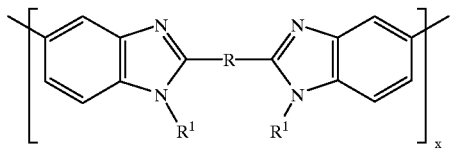

-continued

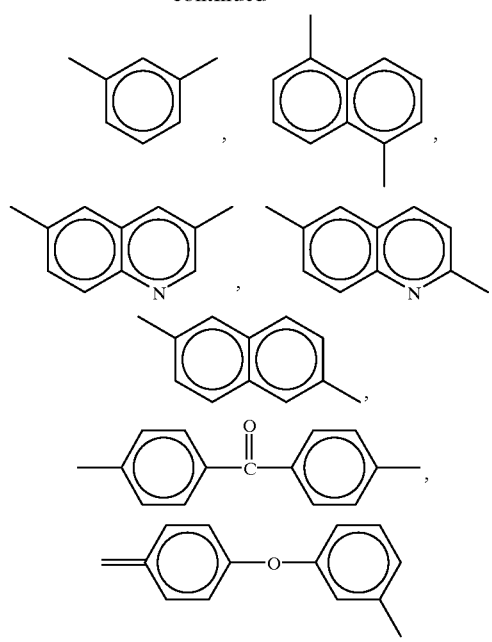

Each of the alkylene radical and the perfluoroalkylene radical, which may be substituent R, preferably contains 1 to 10 carbon atoms and further preferable contains 1 to 6 carbon atoms.

$R^1$ is same or different and a hydrogen atom, alkyl radical or phenyl radical. The alkyl radical preferably contains 1 to 6 carbon atoms, which may be substituted by a halogen atom such as a fluorine atom and sulfone radical.

Alternatively, basic polymers having a formula as follows may be used:

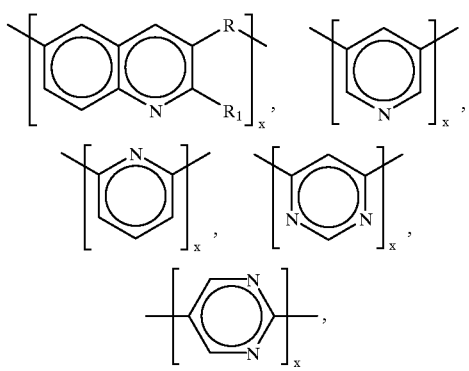

R and $R^1$ have the aforementioned meaning.

The basic polymer may be doped by a strong acid prior to or subsequent to forming into a film. Typically, a polymer electrolyte membrane having a cylindrical configuration is obtained, and the polymer electrolyte membrane is cut off, and then the cut membrane is doped with a strong acid. The strong acid includes, for example, sulfuric acid, phosphoric acid and so on.

In the present invention, the solvent has a boiling point or an azeotropic point ranging from 60 to 220° C., preferably from 100 to 220° C., and further preferably from 70 to 105° C. When the boiling point or an azeotropic point of the solvent is more than 220° C., it may be difficult to remove the solvent. On the other hand, when the boiling point or the azeotropic point of the solvent is less than 60° C., the solvent easily evaporates, and it may be difficult to maintain uniformity of the membrane. As a solvent, water and an organic solvent are preferably used. When an organic solvent is used, the organic solvent is preferably polar. The organic solvent includes, for example, lower amides such as N-methyl-2-pyrrolidone, dimethylacetoamide, dimethylformamide; lower esters such as ethyl acetate; lower ketones such as methylethylketone, di(ethyl)ketone; lower ethers such as tetrahydrofuran; lower alcohols such as methyl alcohol, ethyl alcohol; lower ring esters such as propylene carbonate, ethylene carbonate; and so on. A mixture of these solvents may be used, and, for example, a mixture of water and an organic solvent may be used. When a mixture of at least two solvents is used, the mixture may be an azeotropic mixture. In this case, the azeotropic point is lower than the boiling point of each of the solvent, and it is be preferable in some applications.

Subsequently, the cylinder holding the liquid medium is rotated. Although it depends on a viscosity of the liquid medium, for example, the cylinder may be rotated at a rotating rate of at least 100 rpm, preferably at least 500 rpm, and further preferably at least 1000 rpm. The centrifugal force of the rotation allows to coat the liquid medium on the inner surface of the cylinder and to evaporate the solvent thereof. Consequently, a polymer electrolyte membrane having a cylindrical configuration with a substantially uniform thickness is formed on the inner surface of the cylinder. If desired, a bore of the cylinder may have a reduced pressure by a vacuum pump and so on for increasing an evaporating rate of the solvent. Alternatively, the cylinder may be heated.

The polymer electrolyte membrane typically has a thickness ranging from 1 micrometer to 300 micrometer, preferably 5 micrometer to 100 micrometer, and further preferably 10 to 50 micrometer. The thickness of the polymer electrolyte membrane can be easily controlled by a concentration and/or an amount of the polymer solution added.

The present invention provides a membrane having a highly uniform thickness. For example, when a membrane having an area of about 500 square centimeter, which is typically required for a unit cell of a fuel cell, is produced, distribution of the thickness of the membrane is typically within 5 percent. Proton conductivity depends on a thickness of the membrane, and therefore, a uniform thickness stabilizes performance of the cell.

Subsequent to forming a polymer electrolyte membrane on the inner surface of the cylinder in accordance with the method described above, substantially the same method may be repeated to form a laminated membrane.

Use of a liquid medium containing a catalytic particle therein produces a precursor of a fuel cell having the polymer electrolyte membrane and a catalytic layer laminated thereon. In this case, the polymer electrolyte membrane may be formed, and then the catalytic layer may be formed. Alternatively, the catalytic layer may be initially formed, and then the polymer electrolyte membrane may be formed, and furthermore, the catalytic layer may be formed so that a pair of the catalytic layer sandwiches the polymer electrolyte membrane.

In forming the catalytic layer, the same method as for producing the polymer electrolyte membrane may be used except that the liquid medium additionally contains a catalytic particle. The catalytic particle was explained in reference to FIG. 2.

The polymer electrolyte for the catalytic layer may be the same as or different from the polymer electrolyte for the polymer electrolyte. However, in view of adhesion and continuity of hydrogen ion channels, the polymer electrolyte for the catalytic layer preferably contains the polymer electrolyte for the polymer electrolyte. For example, the polymer electrolyte for the catalytic layer may be a mixture of the polymer electrolyte for the polymer electrolyte and a fluoride resin such as poly(tetrafluoroethylene). Alternatively, the polymer electrolyte for the catalytic layer may be the same as the polymer electrolyte for the polymer electrolyte.

Preferably, the catalytic layer is thin. The catalytic layer typically has a thickness ranging from 1 micrometer to 50 micrometer, preferably 1 micrometer to 20 micrometer, and further preferably 1 to 10 micrometer.

A method in accordance with the present invention produces a catalytic layer having a uniform thickness, thereby allowing to increase the efficiency of the catalyst and to decrease an amount of the catalyst required. Moreover, the present invention increases adhesion between the polymer electrolyte membrane and the catalytic layer for decreasing electrical resistance at the interface thereof, thereby increasing an output of the fuel cell.

EXAMPLES

Example 1

A poly(etherketone) resin having a sulfonation rate of about 50 percent was dissolved in N-methyl-2-pyrrolidone to obtain a solution of the resin having a concentration of 4.5 percent by weight. 50 ml of the solution was introduced into a metallic cylinder having a cylindrical configuration with an inner diameter of 51 millimeter and a length of 408 millimeter. The cylinder was made of stainless steel. The cylinder was rotated at 90° C. for two hours at 1050 rpm under a reduced pressure to obtain a polymer electrolyte membrane having a cylindrical configuration. A thickness of the polymer electrolyte membrane was determined at any six points. An average of the thickness was 20.8 micrometers. A deviation from the average thickness to the maximum determined value or the minimum determined value was within 1.0 micrometer.

Example 2

A poly(benzimidazole) resin from Hoechst Celanese was dissolved in N,N-dimethylacetoamide to obtain a solution of the resin having a concentration of 5.0 percent by weight. 155 ml of the solution was introduced into a cylinder having a cylindrical configuration with an inner diameter of 150 millimeter and a length of 360 millimeter. The cylinder was rotated for one hour at 1000 rpm to obtain a polymer electrolyte membrane having a cylindrical configuration. A thickness of the polymer electrolyte membrane was determined at any six points. An average of the thickness was 53.8 micrometer. A deviation from the average thickness to the maximum determined value or the minimum determined value was within 2 micrometer.

Example 3

The polymer electrolyte membrane obtained in Example 2 was cut into a disc with a diameter of 7 cm, and the disc was immersed in phosphoric acid, which is commercially available, at room temperature for 24 hours. The disc was further cut into another disc with a diameter of 5 cm. Subsequently, the smaller disc was placed between a pair of carbon electrodes, which are adapted to a polymer electrolyte for a fuel cell, and which is commercially available. The laminated structure was subject to hot pressing at 140° C. with a pressure of 50 kgf/cm$^2$, wherein 1 kgf/cm$^2$ corresponds to about 9.8×10⁴ N/m² or 9.8×10⁴ Pa, to produce a unit cell for a fuel cell. A hydrogen gas and air were introduced into the unit cell for generating electricity. An output of 0.4 volt with 650 mW/cm² was obtained.

For example, J. Electrochem. Soc., Vol. 142, No. 7, pp. L121–123 discloses a unit cell for a fuel cell, obtained by the same method except that the film was obtained by a standard casting process. A hydrogen gas and an oxygen gas, which should produce a higher output than air, were introduced into the conventional unit cell for generating electricity. The maximum output was merely 250 mW/cm².

Example 4

A polymer electrolyte was obtained in the same method as Example 1. While the polymer electrolyte remained in the cylinder, a slurry for a catalytic layer was introduced into the cylinder. The slurry contained carbon powder loading 20 percent by weight of platinum, a polymer powder made of the same polymer material as the polymer electrolyte membrane, and water. The cylinder was rotated for one hour with 1000 rpm to remove the water to produce a laminated film having the polymer electrolyte membrane and the catalytic layer.

The catalytic layer was extremely uniform, and formed over an entire surface of the polymer electrolyte membrane. Even though the laminated film was not subject to hot pressing, the catalytic layer did not peel off from the polymer electrolyte membrane by a standard adhesive tape. The results show that the catalytic layer has a satisfactory adhesion.

A producing method in accordance with the present invention is capable of producing a polymer electrolyte membrane for a fuel cell with a uniform thickness, thereby stabilizing performance of the fuel cell. Moreover, when a catalytic layer is formed onto a surface of the polymer electrolyte membrane, the catalytic layer has a uniform thickness also, thereby allowing to increase the efficiency of the catalyst. It also increases adhesion between the polymer electrolyte membrane and the catalytic layer for decreasing electrical resistance at the interface thereof, thereby increasing an output of the fuel cell.

What is claimed is:

1. A method for producing a polymer electrolyte membrane adapted to a fuel cell, comprising the steps of:

introducing a first liquid medium into a cylinder having an inner surface having a cylindrical configuration; and rotating the cylinder for forming a membrane having a cylindrical configuration with a substantially uniform thickness on the inner surface of the cylinder by means of a centrifugal force while evaporating the first solvent;

characterized in that:

the first liquid medium has at least one percent by weight of a first polymer electrolyte and a first solvent having a boiling point or an azeotropic point ranging from 60 to 220° C.; and the membrane is made of the first polymer electrolyte.

2. A method of claim 1 wherein the polymer electrolyte is a thermoplastic polymer having a sulfonation rate of 30 to 90 percent or a basic polymer.

3. A method of claim 1 wherein the polymer electrolyte is a polyether having a sulfonation rate of 30 to 90 percent or poly(benzimadazole).

4. A method of claim 1, further comprising the steps of:

subsequent to the introducing step and the rotating step, introducing a second liquid medium into the cylinder with the first polymer electrolyte membrane, the second liquid medium having a catalytic particle, at least one percent by weight of a second polymer electrolyte and a second solvent having a boiling point or an azeotropic point ranging from 60 to 220° C.; and rotating the cylinder for forming a catalytic layer having a cylindrical configuration with a substantially uniform thickness, having a catalytic particle therein and being disposed on the inner surface of the first polymer electrolyte membrane by means of a centrifugal force while evaporating the second solvent.

5. A method of claim 2 wherein the second polymer electrolyte is the same as the polymer electrolyte.

* * * * *